United States Patent [19]

Telefus

[11] Patent Number: 5,032,970
[45] Date of Patent: * Jul. 16, 1991

[54] SWITCHING MODE POWER SUPPLY START-UP CIRCUIT

[76] Inventor: Mark Telefus, 2518 14th Ave., San Francisco, Calif. 94127

[ * ] Notice: The portion of the term of this patent subsequent to Dec. 26, 2006 has been disclaimed.

[21] Appl. No.: 429,784

[22] Filed: Oct. 16, 1989

Related U.S. Application Data

[63] Continuation of Ser. No. 318,512, Feb. 5, 1988, Pat. No. 4,890,211.

[51] Int. Cl.$^5$ .......................................... H02M 3/335
[52] U.S. Cl. .......................................... 363/37; 363/49
[58] Field of Search ..................... 363/21, 49, 69, 70, 363/71, 37, 142, 143; 323/901, 345, 346, 361, 247

[56] References Cited

U.S. PATENT DOCUMENTS

| | | | |
|---|---|---|---|
| 3,270,270 | 8/1966 | Yemisey | 363/101 |
| 3,350,625 | 10/1967 | Larsen | 363/49 |
| 3,470,444 | 9/1969 | Bixby | 363/101 |
| 3,549,990 | 12/1970 | Hochheiser | 313/345 |
| 3,611,117 | 10/1971 | Schneider | 323/45 |
| 4,017,787 | 4/1977 | Hara et al. | 363/49 |
| 4,130,862 | 12/1978 | Holt | 363/49 |
| 4,389,702 | 6/1983 | Clemente et al. | 363/21 |
| 4,686,616 | 8/1987 | Williamson | 363/49 |
| 4,695,936 | 9/1987 | Whittle | 363/21 |

FOREIGN PATENT DOCUMENTS

| | | | |
|---|---|---|---|
| 190493 | 8/1986 | European Pat. Off. | 363/49 |
| 603526 | 4/1960 | Italy | 323/345 |

*Primary Examiner*—William H. Beha, Jr.
*Attorney, Agent, or Firm*—Blakely, Sokoloff, Taylor & Zafman

[57] ABSTRACT

A start-up circuit for a switching mode power supply is described. The circuit has an initial supply means for initiating pulses from a pulse generator. Latches are used once a stable output current is established to disengage the initial power supply. Thus, the pulse generator and the switching transistor are protected from power surges.

6 Claims, 2 Drawing Sheets

FIG_2
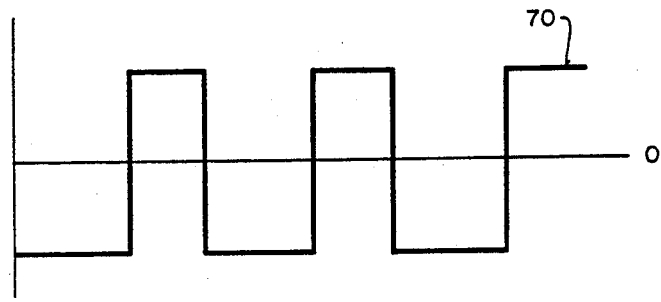
FIG_3
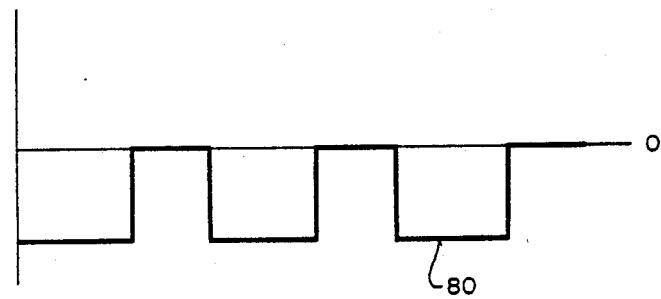
FIG_4
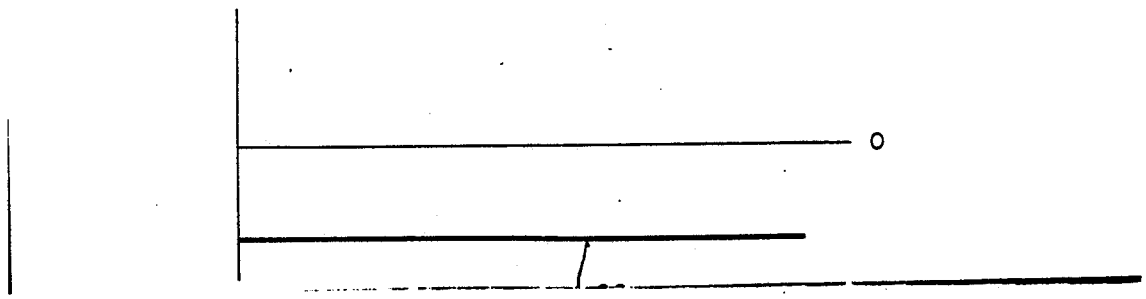

SWITCHING MODE POWER SUPPLY START-UP CIRCUIT

This is a continuation of application Ser. No. 318,512, filed Feb. 5, 1988, now U.S. Pat. No. 4,890,211.

BACKGROUND OF THE INVENTION

1. Field of the Invention

The field of the invention is that of start-up circuits of switching mode power supply circuits.

2. Prior Art

Many devices are known in the art that provide start-up circuits for power supplies. However, the problem with those circuits is that they fail to protect the power supply circuitry from aberrations in the current being converted. Start-up circuits for switching mode power supplies are problematic because they must provide initial power to generate a modulated pulse to control a transistor power switch.

Power supplies take a current source and produce another current source of a different character. A common type of power supply is that which takes as input a high voltage and line frequency alternating current (common commercial and residential voltage of 110 V and 60 Hz of AC). The end result is a low voltage direct current (such as 12 V DC). At some stage of the conversion, the incoming current must be modulated smooth the incoming current cycles to produce a substantially constant output current.

Switching mode power supplies use converters in conjunction with an oscillating means to regulate the current cycles. Switching mode power supplies are designed to convert input line frequency voltage in DC voltage then inverting that input to a high frequency AC voltage by a transistor power circuit. The transistor power circuit feeds the high frequency voltage through an output transformer, which then rectifies and filters it to produce the required DC voltage. Regulation of the output is accomplished by controlling the pulse width of the high frequency voltage wave. In order to run a switching mode power supply a pulse generator must be used to generate a pulse width, and where the power supply is off-line, the pulse generator has no initial power to operate an oscillating means. Pulse generators provide periodic signals of varying widths to control the amount of current that is allowed to pass through the primary side winding(s) of the power supply's transformer(s). The width of the on and off signals are dynamically determined by the pulse generator according to the output of the power supply. Several prior art circuits provide start-up circuitry for initial generation of pulses but all fail to protect the entire power supply as well as the start-up circuitry from over stressed voltage conditions.

During the initial start-up, it is possible that power transformers and their transistor power switches will become over stressed. Lack of initial duty cycle control creates that possibility when the transistor power switch operates with a duty cycle higher than 50% in the initial cycles. In forward or fly-back topologies, operating with a duty cycle of more than 50% causes the probability of power transformer saturation and power switch burn-out.

There are standard types of power conversion techniques known in the art. One is step-up conversion, which is a boost type conversion also known as a fly-back converter. Another is a step-down conversion, also known as a forward conversion. In the fly-back converter, energy is inductively stored during the transistor power-on periods, then during the fly-back or transistor power-off periods the inductor passes the stored energy to the load. In the forward converter, during the transistor power-on period, energy is stored in the power inductor and passes to the load. During the transistor power-off period, energy stored in the inductor continues to provide current flows to the load. All types of topologies generally require some sort of start-up circuitry to initiate the modulated pulse widths to control the transistor switch.

A start-up circuit is described in U.S. Pat. No. 4,063,307. This circuit is limited in application with fly-back converters. Also, this device is complicated, expensive, and unreliable.

Another start-up circuit is described in U.S. Pat. No. 4,246,634. One major problem with this circuit is that the pulse generator has no voltage insulation, with the pulse generation positioned on the primary side and exposed to potentially destructive high voltage surges. Second, the pulse generator monitors the primary side (input) voltage and not the secondary side (output) voltage.

Still another start-up circuit for a switching mode power supply is described in U.S. Pat. No. 4,695,936. In this device the pulse generator is located on the secondary side. The start-up circuit is located on the primary side, and it activates the switching transistor to start the power supply. The first embodiment described is a start-up circuit that continues to oscillate after the pulse generator commences to regulate. This arrangement is undesirable because the pulse generator has imperfect control over the oscillation means. Also, if the combination of pulse generator pulses and start-up circuit pulses create a duty cycle of over 50% then the transistor will begin to break down. The alternate embodiment described contains a circuit for disengaging the starting circuit, but the disengaging circuitry must be perfectly timed to work, and in practical terms, is too unreliable for use.

What is needed is a start-up circuit for a switching mode power supply that initially fully controls the start of modulated width pulses, then provides for a series of width modulated pulses to control the start of the power supply. Another object of the present invention is to provide a start-up circuit for a pulse generator which will automatically disengage after normal operation has been initiated.

SUMMARY OF THE INVENTION

The present invention is a start-up circuit for a switching mode power supply. The start-up circuit provides initial power to the switching mode power supply's pulse generator, and maintains control until a stable output voltage is established. In this manner, both the pulse generator and the power supply's switching transistor are protected from potentially destructive surges.

BRIEF DESCRIPTION OF THE DRAWINGS

FIG. 2 is a timing diagram of the pulses of the pulse generator at node A of FIG. 1.

FIG. 3 is a timing diagram of the pulses of the pulse generator at node B of FIG. 1.

FIG. 4 is a timing diagram of the pulses of the pulse generator at node C of FIG. 1.

DETAILED DESCRIPTION OF THE INVENTION

Figure 1:
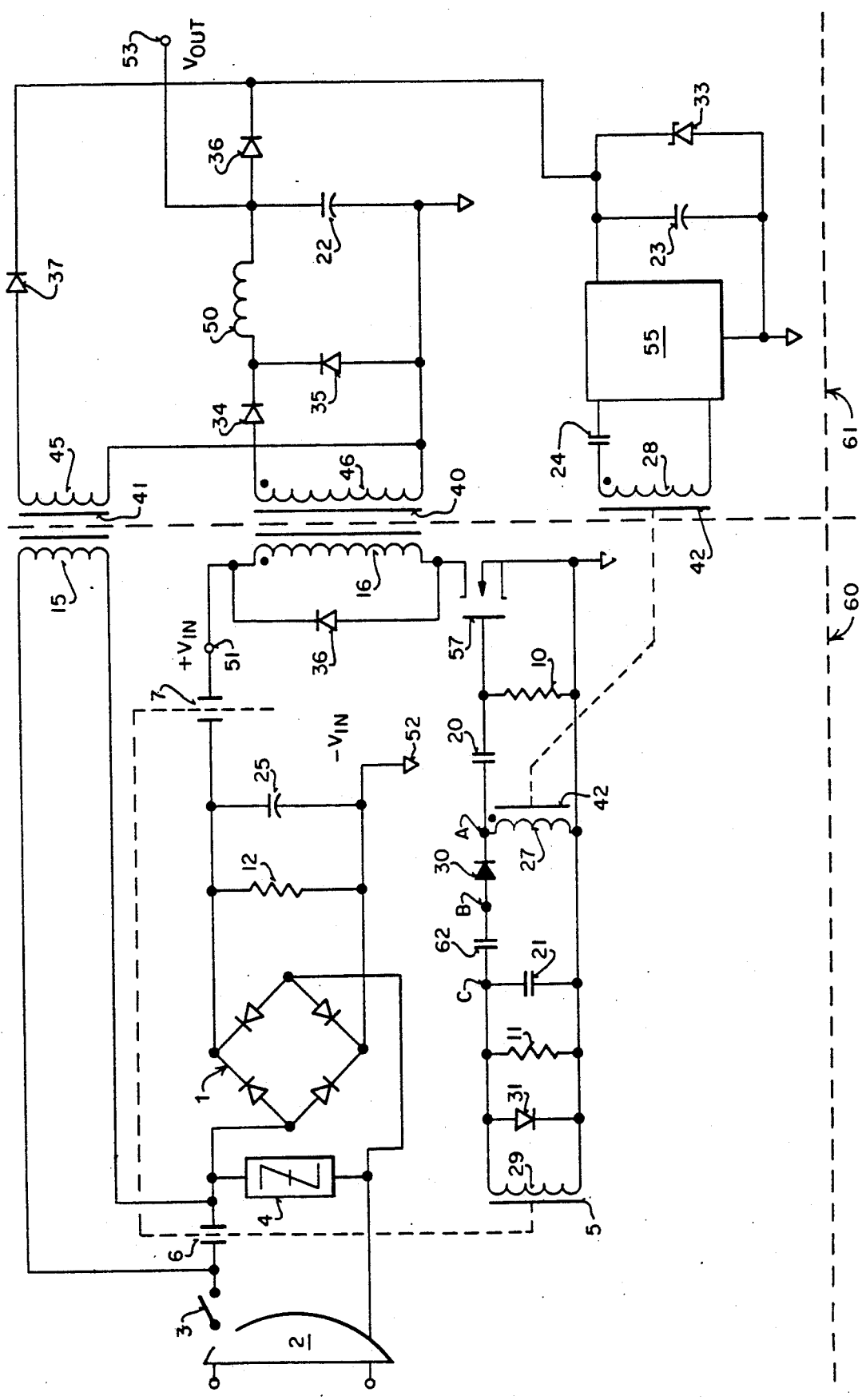
FIG. 1 is a circuit diagram of the preferred embodiment of the invention.

The present invention describes a start-up circuit for any off-line switching mode power supply. In the following description, numerous specific details are set forth in order to provide a thorough understanding of the present invention. It will be obvious, however, to one skilled in the art that the present invention many be practiced without these specific details. In other instances, well-known methods have not been described in detail so as not to unnecessarily obscure the present invention.

The preferred embodiment is shown in FIG. 1. The power supply circuit comprises a primary side 60 and a secondary side 61. In the preferred embodiment, the start-up circuit is combined with a forward converter.

The primary side 60 receives the alternating current (AC) input at AC source 2. One of the lines from AC source 2 is coupled with a switch 3. The switch 3 is also coupled to a line having a primary winding coil 15 at transformer 41. Between the lines coupled to both ends of primary winding coil 15 is a latch 6. An EMI Filter 4 is coupled to both lines from AC source 2, with latch 6 between AC source 2 and one of the EMI Filter 4's connections. Parallel with EMI Filter 4 is a AC/DC Rectifier 1.

AC/DC Rectifier 1 has two output lines, coupled in parallel with resistor 12 and capacitor 25. One of AC/DC rectifier 1's lines leads to −Vin 52. −Vin 52 is coupled with the direct current (DC) ground. The line of AC/DC rectifier 1 is coupled to latch 7. When closed, latch 7 couples AC/DC rectifier 1 to +Vin 51, the primary DC source of the operational power supply. +Vin 51 is then coupled to the primary transformer 40's primary side circuitry 60.

Transformer 40's primary side circuitry comprises primary winding coil 16 and diode 36 which are coupled in parallel between +Vin 51 and the drain of switching transistor 57. The source of switching transistor 57 is coupled to ground.

The primary side switching circuitry comprises a switching transistor 57 with a gate coupled to both a capacitor 20 and a resistor 10. Coupled to the non-gate coupled sides of capacitor 20 and resistor 10 is secondary coil 27 of pulse transformer 42.

Latch enabling circuitry used to close latches 6 and 7 comprises the parallel coupling of coil 29, diode 31, resistor 11, and capacitor 21 coupled in series with diode 30 and capacitor 62. This circuitry is coupled to secondary coil 27. Coil relay 29 is coupled to latch enable means 5.

In the preferred embodiment, the secondary side circuitry is designed to satisfy all the requirements of such standards as UL, CSA, VDE, etc. The forward converter circuitry lies on the secondary side 61. Secondary side 61 comprises secondary coil 46 of transformer 40, rectifier diode 34, flywheel diode 35, inductor 50, and capacitor 22 to produce Vout 53. The pulse generator circuit 55 is coupled in series to capacitor 24 and coil 28. Coil 28 is a primary of pulse transformer 42. Initial power circuitry for pulse generator 55 comprises of the parallel circuit of capacitor 23 and Zener diode 33, with one end of the circuit coupled to pulse generator 55 and the other end coupled to ground. At the secondary side of transformer 41 is secondary winding coil 45. One end of secondary winding coil 45 is coupled to diode 37 which is in turn coupled to the initial power circuitry of pulse generator 55. Coupled between capacitor 22, inducer 50, and the initial power circuitry of pulse generator 55 is diode 36.

The start-up circuitry performs as follows. The first step is turning on the power supply, by closing switch 3. This forms a closed circuit for AC source 2, and applies the AC source 2 to the power supply. Latches 6 and 7 remain open, so +Vin 51 has no electrical potential. AC Current is forced to follow through primary winding 15 and EMI filter 4. The AC current in primary coil 15 of transformer 41 induces an AC voltage in secondary coil 45 by transformer The secondary side AC voltage is proportional to the primary AC current and the total EMI impedance according to the following formula:

$$V_{secondary} \, AC = \frac{110 V_{AC} \times Z_0}{Z_{EMI} \times N}$$

Where $Z_0$ is the total secondary load impedance, $Z_{EMI}$ is the EMI filter's impedance, and N is the turns ratio of transformer 41. The secondary AC voltage from transformer 41 is rectified primarily by diode 37. The rectified voltage of transformer 41 is stored on capacitor 23, while Zener diode 33 maintains a limit on line voltage, in the preferred embodiment the limit is 24 V. Capacitor 23 also performs a filtering function. Pulse generator 55 is suppled a well modulated input current during the initial start-up, with protection and isolation from voltage surges. The secondary AC voltage from transformer 41 is electrically isolated from the primary side 60 by isolation construction within the transformer, which is designed and built to meet such requirements as UL, CSA, VDE, etc. In this manner, pulse generator 55 is not only supplied with sufficient power to operate but is completely isolated from the primary side 60.

When the pulse generator 55 is suppled with sufficient power, it begins to send pulses on pulse transformer 42. Coil 27 induces a current on coil 28 by pulse transformer 42. These currents create pulses that define the duty cycle. Pulses are shown in FIGS. 2, 3, and 4. FIG. 2 shows a pulse 70, as it appears from the perspective of node A of FIG. 1. Pulse 70 has two phases, termed a power on phase and a power off phase. The power on phase is the portion of pulse 70 that is above the 0 line of FIG. 2. The power off phase is the portion of pulse 70 that is below the 0 line. The power off phase pulse width must be greater than the power on phase pulse width to insure the duty cycle does not exceed 50%. FIG. 3 shows the pulses as they appear from the perspective of node B of FIG. 1. FIG. 4 shows the pulses as they appear from the perspective of node C of FIG. 1. The pulses have two effects. One is to apply a voltage to the gate of switching transistor 57, although this only becomes significant once latches 6 and 7 close. The other function is to activate the latch enabling means 5. Latch enabling means 5 is coupled to latches 6 and 7, and when a predetermined amount of current is present on coil 29 latches 6 and 7 close.

Latches 6 and 7 close once sufficient voltage is present on coil 29. Once latch 7 is closed, +Vin becomes a voltage source. High DC voltage from AC/DC rectifier 1 and input filter, comprising resistor 12 and capacitor 25, is applied across primary winding coil 16 of power transformer 40 when switching transistor 57 is on.

The latches of the present invention may be any of several devices well known in the art, such as power relays, solid state relays, and semiconductors. They may be permanent latches, meaning the latch remains closed after receiving an activating signal until all power ceases. Or they may be temporary latches, meaning the latch remains closed only while an activating signal is present. The preferred embodiment uses permanent latches, although either type can be used with the present invention.

When the switching transistor 57 turns on high DC voltage drops across primary coil 16 at the power transformer 40. Rectifier diode 34 on secondary winding coil 46 conducts energy which is simultaneously stored in power inductor 50 and passed to output 53. When the transistor 57 turns off, flywheel diode 35 conducts and power inductor 50 continues to deliver energy to output 53. Smoothing capacitor 22 reduces the output ripple caused by transistor switching. At the same time, diode 36, coupled to output power 53, very efficiently and effectively acts to supply reliable permanent power for the pulse generator.

The pulse generator 55 monitors the Vout 53 voltage and sends pulses to switching transformer 42 so that the Vout 53 voltage is within an acceptable output voltage range. The duty cycle of its pulses varies, although never exceeding 50%. The pulses turns on and off switching transistor 57. The resistor 10 serves to bias the gate while capacitor 20 serves to filter the pulse voltage. The diode 30 prevents any negative flow of current from the switching circuit from flowing through the latch enabling circuitry.

The latch enabling circuitry needs to be able to supply enough power to activate the coil relay 29. Because the pulse generator 55 supplies only a low power voltage signal, additional power boosting circuitry may be necessary to activate the relay coil 29.

When latch 6 closes, the transformer 41 effectively removed from the active circuit. When latch 7 closes, the +Vin 51 becomes a high voltage DC source. The primary transformer 40 does not induce voltage on the secondary side until switching transistor 57 is on. If latch 7 closes before or at the same time as latch 6 closes, pulse generator 55 will not lose power and the power supply will operate normally. However, if latch 6 closes before latch 7, diode 37 will stop supplying current to pulse generator 55. It is possible that pulse generator 55 will run out of power before latch 7 closes. Thus, switching transistor 57 will never turn on so that primary transformer 40 will not induce voltage on the secondary side. This is a worst case scenario, and no permanent damage will occur. To help prevent this from happening, capacitor 23's stored charge can supply the pulse generator 55 power during the latching delay. Once primary transformer 40 begins to induce voltage on the secondary side, diode 36 supplies pulse generator 55 with power.

By this means, the pulse generator 55 first begins to control the switching pulses. After control is established, the switching circuitry controls the start of the power supply. Once secondary side voltage is established, the pulse generator is supplied by internal power by diode 36 and the initial start-up circuitry is effectively removed. A power supply where the control circuitry is located on the secondary side provides all the benefits of stable regulation and effective, reliable protection. In the event of abnormal conditions, for example a short in the secondary output voltage 53 which stops providing energy to the pulse generator 55, pulse generator 55 would shut off automatically and latches 6 and 7 remain closed. Pulse generator 5 will remain inactive until AC source 2 is reset by opening switch 3, which reactivates all the latch enabling means. If temporary latches were used in the example above, after pulse generator 55 became inactive, latches 6 and 7 would open. This would cause transformer 41 to become active and start to supply pulse generator 55 with power so that the power supply would automatically restart.

The present invention may also be used as a method of fuse protection for when certain abnormal conditions occur the power supply will become inactive.

Thus, a start-up circuit for any off-line switching mode power supply is described.

I claim:

1. A power supply having a primary side and a secondary side, said primary side coupled to a power source, said primary side comprising:
    a first primary winding coil of a first transformer coupled in parallel with a latch means, said first primary winding coil coupled with a filter means and said filter means coupled with said power source so that said first primary winding coil of said first transformer has only partial voltage of said power source;
    a second primary winding coil of a second transformer having a first lead coupled with said latch means and a second lead coupled to a switching transistor;
    said latch means for preventing current flow from said power source to said second primary winding coil of said second transformer, said latch means coupled to said power source;
    latch enabling means coupled with said latch means for closing said latch means responsive to receiving electrical pulses from a pulse generator of said secondary side.

2. The power supply, as recited by claim 1, wherein said secondary side comprises a pulse generator coupled with a secondary winding coil of said first transformer, said pulse generator supplying electrical pulses to said latch enabling means.

3. The power supply, as recited by claim 1, wherein said power source is an alternating current power source.

4. The power supply, as recited by claim 3, wherein said second primary winding is coupled through a rectifying means to said alternating current power source.

5. The power supply, as recited by claim 1, wherein a lead of said first primary winding of said first transformer is coupled through a filter means to said power source.

6. The power supply, as recited by claim 1, wherein said latch means is electrically coupled with said power source.

* * * * *